Jan. 13, 1953 M. H. PHILLIPPI 2,624,967
DISPLAY SIGN AND METHOD OF MAKING THE SAME
Filed Aug. 7, 1950 4 Sheets-Sheet 1
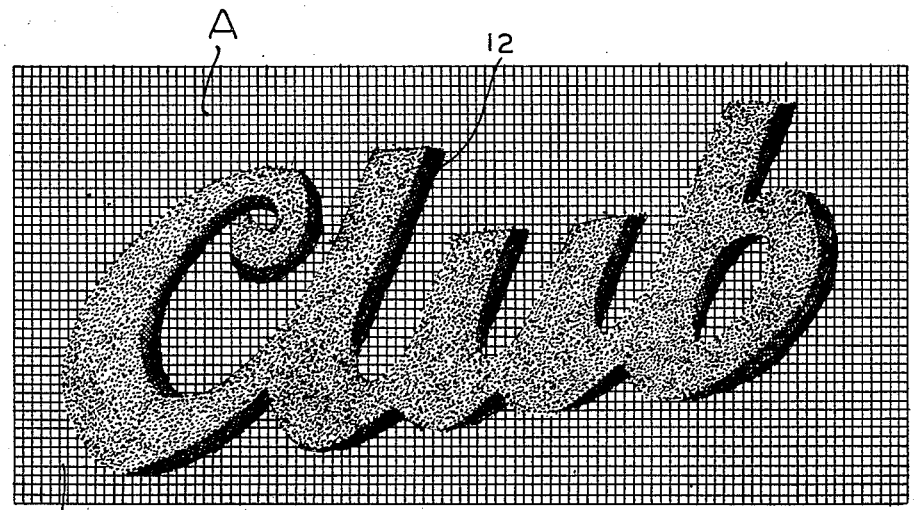
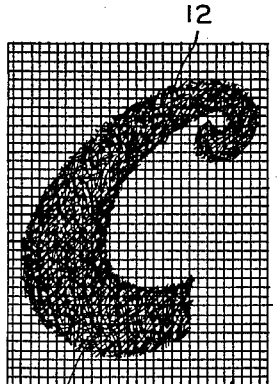
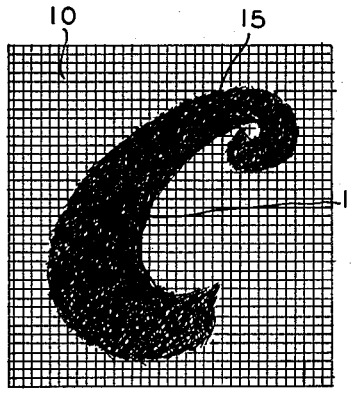
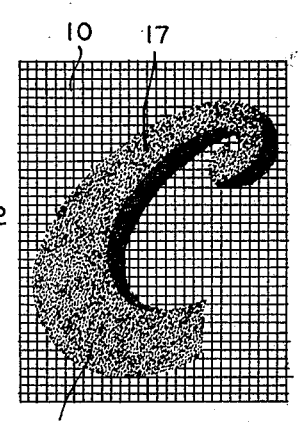
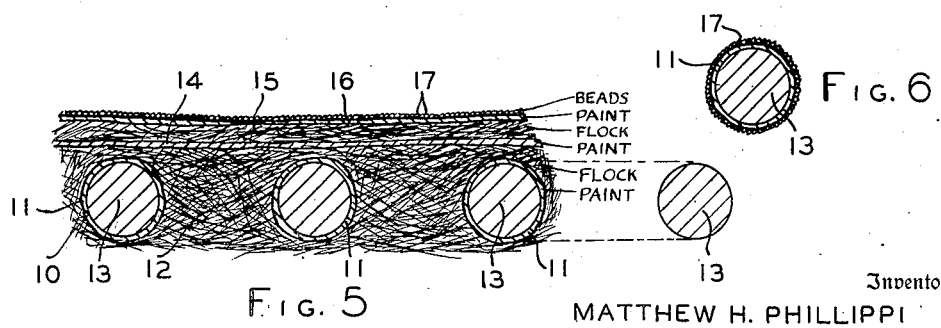
Inventor
MATTHEW H. PHILLIPPI
By
Attorney

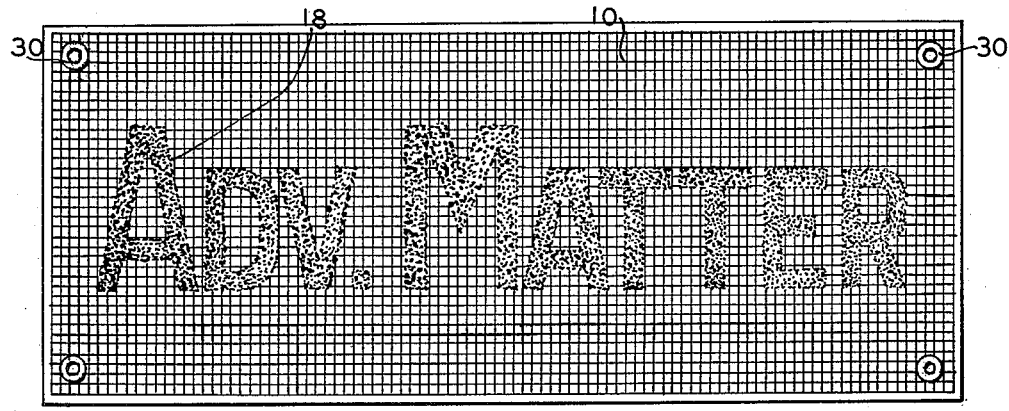
Fig. 7
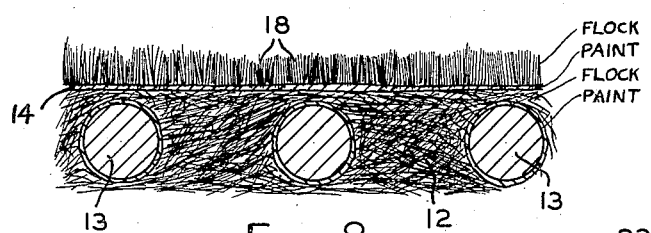
Fig. 8
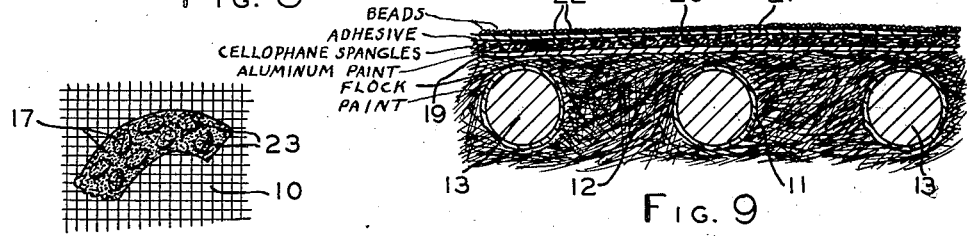
Fig. 9
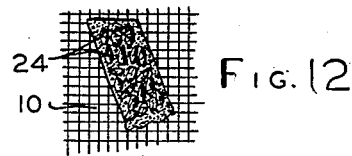
Fig. 10
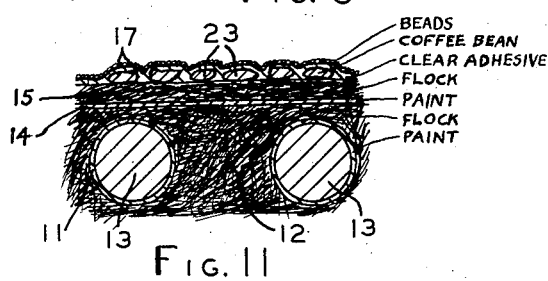
Fig. 11
Fig. 12
Fig. 13
Inventor
MATTHEW H. PHILLIPPI
Attorney Jan. 13, 1953 M. H. PHILLIPPI 2,624,967
DISPLAY SIGN AND METHOD OF MAKING THE SAME
Filed Aug. 7, 1950 4 Sheets-Sheet 3

Inventor
MATTHEW H. PHILLIPPI
By
Attorney

Jan. 13, 1953 M. H. PHILLIPPI 2,624,967
DISPLAY SIGN AND METHOD OF MAKING THE SAME
Filed Aug. 7, 1950 4 Sheets-Sheet 4

Inventor
MATTHEW H. PHILLIPPI
By
Attorney

Patented Jan. 13, 1953

2,624,967

UNITED STATES PATENT OFFICE 2,624,967

DISPLAY SIGN AND METHOD OF MAKING THE SAME

Matthew H. Phillippi, St. Paul, Minn., assignor of twenty-four per cent each to Charles V. Welty and Howard L. Fischer, both of St. Paul, Minn.

Application August 7, 1950, Serial No. 178,124

2 Claims. (Cl. 40—135)

This invention relates to display signs and method of making the same, wherein the support for the sign or display is wire screen which permits air to pass through the background of the sign, and thus forms a support for the display with a low wind resistance.

A primary feature resides in the method of making a sign consisting in building up a display on a wire mesh as a background. The method includes first applying by screen stenciling or otherwise applying a layer of paint in color on translucent or transparent material, then applying a layer of rayon, nylon, or cellulose flock which consists of fibrous members of any desired color, including fluorescent flock of a low moisture absorbing nature; then applying another layer of paint, lacquer, or other adhesive material over the flock, then applying additional layers of flock and paint to complete the built up sign or display which is firmly secured to the wire mesh by the under-layer of flock, the fibers of which extend through and adhere to the back of the wire screen, thereby anchoring the display firmly to the screen support.

A further feature of my invention resides in building up by my method a display sign or decorative display, wherein the various layers of flock and paint which are laid one upon the other may be offset to provide a shading along the edge of the letter or configuration which forms the sign so that I am able by my method to accentuate and make the sign or display stand out in relief. My method permits me to use a base flock of one color and then apply another layer of flock of a different color with the offset edges illustrating the different colored layers of flock, and then applying additional layers of different colored flock and paint, as well as minute light reflecting transparent glass beads which are held imbedded in the top layer of paint and flock by reason of applying the beads before the paint or lacquer is dry. In this manner I provide a light reflecting display or sign having an extremely attractive and decorative nature.

The attractive nature of my sign is enhanced by the fuzzy edge, particularly the shaded edge of the letters or figures of the display. Thus, the display may have a black or red base flock over which a blue, yellow, or any other contrasting colored flock may be applied. Then over all of the layers of flock a different colored paint may be applied into which reflecting glass beads can be anchored before the last layer of paint is dry, thereby providing a display sign which appears to be illuminated by reflecting light shining on the same at night.

It is also a feature to provide a display or sign with a low wind resisting background such as the wire mesh screen or cloth made of suitable weather resisting material, and to provide a display when supported in a field or along the highway, wherein the display appears to be supported in midair.

A further feature in the screen background resides in the flexible nature of the same. The screen background of the sign may be mounted in any suitable manner by eyelets extending through the corners of the screen so that the wire may be wired or anchored to any suitable support.

A further feature of my display sign resides in applying various products directly upon the sign to cause the products to be adhered to the display, either in the letters forming the sign or to the display portions thereof, wherein such articles as coffee beans, wheat, corn, and other articles desired to be displayed by the sign may be imbedded in the display surface of the same and which may be covered with a preserving and transparent lacquer in which glass beads are imbedded to accentuate the display at night with light reflecting qualities which make the sign more visible at night.

A further feature resides in providing display signs which may be made up in sections to illustrate different names or firms, and providing a display rack in which the sections can be slid into place to form a collective display. In this form, any one of the sections may be removed and a different name or display inserted therein. In this display sign, the wind will not materially affect the same because of the open screen background, and each section of the screen is anchored sufficiently to hold it in place, but permitting the sections to be removed by removing the anchoring means which hold it in place.

I also have provided a billboard type of display which can be set up in any field or position where the display is desired to be used, and in a display of this character, if the billboard is large, the sign can be divided in sections which can be anchored in place by any suitable means.

A billboard sign of this character may be made using a framework of metal pipe to which a strong fence material is secured which forms a frame for securing the screen sections of my display to make up the complete sign. In this manner, any or all of the sections may be removed or replaced at any time, and when the sections are all put together on the billboard fence, the complete display is accomplished. This type of billboard permits the scenery back of the display to be visible through the screen of the display which enhances its appearance and overcomes the necessity of painting in a background of trees or other scenery. A display billboard of this character is very desirable because of its low wind resistance and because it takes advantage of the scenery in back of the display.

With this type of billboard display I can illustrate animals as if standing in a field. I can also show an automobile with the natural background scenery. These are just some of the examples of the possibilities of my billboard screen sign and display.

A further feature of my display sign resides in positioning one screen above the other or in front of the other, either in parallel relation or in angular relation to each other, and stenciling or painting a display on each of the screens. In carrying out this form of my display sign, the top or front screen is stenciled with a display preferably by colored paint which covers the wires of the screen in the forming of the display or stencil, but does not cover the open spaces between the crossing wires of the screen. I then stencil a design on the lower screen in a different colored paint or adhesive, and before the same is dry I dust on the paint or adhesive small glass beads which adhere to the paint and become partially imbedded therein so as to form part of the sign or display.

This last display or sign is made up of one or more layers of screen which are secured together in parallel or angular relation to each other. When this sign is put on display, the display stenciled on the front screen will be ordinarily the only sign or display that is visible; however, if a beam of light is directed against this double sign, the glass beads on the back screen will reflect the light (such as the light from automobile headlights) and the front display will not be visible.

In this manner, I have developed a display having a two-fold utility, wherein the front display is visible ordinarily in the daylight and the back display is visible at night when light is reflected against the same. It will be apparent that the reflecting light against this screen will extend through the open mesh of the front screen and permit the back screen to be brilliantly visible.

The drawings illustrate the various figures which I have employed to show the manner in which I carry out my method of making my displays and assist in describing the same.

Figure 1 is a digrammatic illustration of a display formed on a wire screen support or background and illustrates the shading along one edge of the letters.

Figure 2 illustrates a section of wire screen showing the first step of my process where the adhesive, paint or lacquer is first applied to the wire mesh, and then a layer of fibrous flock is applied.

Figure 3 illustrates a detail of a section of screen wire showing the next step of my method where an additional layer of paint and flock is applied.

Figure 4 illustrates the next step of my method which I employ in finishing the sign or display and illustrates the manner in which the final layer is applied over the first layers showing the offsetting of the same so as to illustrate a marginal shading by the various formerly applied layers of paint and flock.

Figure 5 is a diagrammatic enlarged section through several of the wires which form the wire screen and which show the flock and adhesive layers built up on the wires to form a finished display surface on one side of the wire mesh.

Figure 6 illustrates an enlarged section of one of the wires of the wire screen or mesh showing the manner in which glass light reflecting beads can be adhered around the entire surface of each wire of the screen. This step of the process may be employed before layers of flock are applied to the surface of the mesh. Thus, the entire wires of the background of the sign may be covered with glass light reflecting beads to reflect the colored paint or enamel that has been applied to the screen or wire before the beads are secured thereto.

Figure 7 illustrates a display sign made by my process showing some suitable advertising subject-matter, and where the layers of flock and paint or colors are in complete registry, one with each other, so that a sharp, defined border is accomplished without any shading of the letters.

Figure 8 illustrates an enlarged section similar to Figure 5, showing the various steps of my process in which a layer of flock is the final covering employed on the face of the display.

Figure 9 is a similar section to Figure 8, illustrating another series of steps in my process of making a display sign.

Figure 10 is a small detail showing the surface of a sign on the wire mesh, wherein coffee beans are adhered to the same and which are covered with glass beads, the actual coffee beans being secured by lacquer, which seals the same to the surface of the sign, and before the lacquer is dry, a layer of fine light reflecting beads is imbedded in the lacquer.

Figure 11 is an enlarged detail section of the wires of the sign illustrated in Figure 10 in which the coffee beans are illustrated sealed to the surface of the sign.

Figure 12 is a small detail of the wire mesh sign showing kernels of wheat sealed to the surface of the sign in the same manner as the coffee beans are sealed in Figures 10 and 11.

Figure 13 illustrates another detail portion of my wire mesh sign showing particles of coal sealed into the surface of the sign with the glass beads imbedded in the sealing lacquer which covers the particles of coal.

Figure 14:
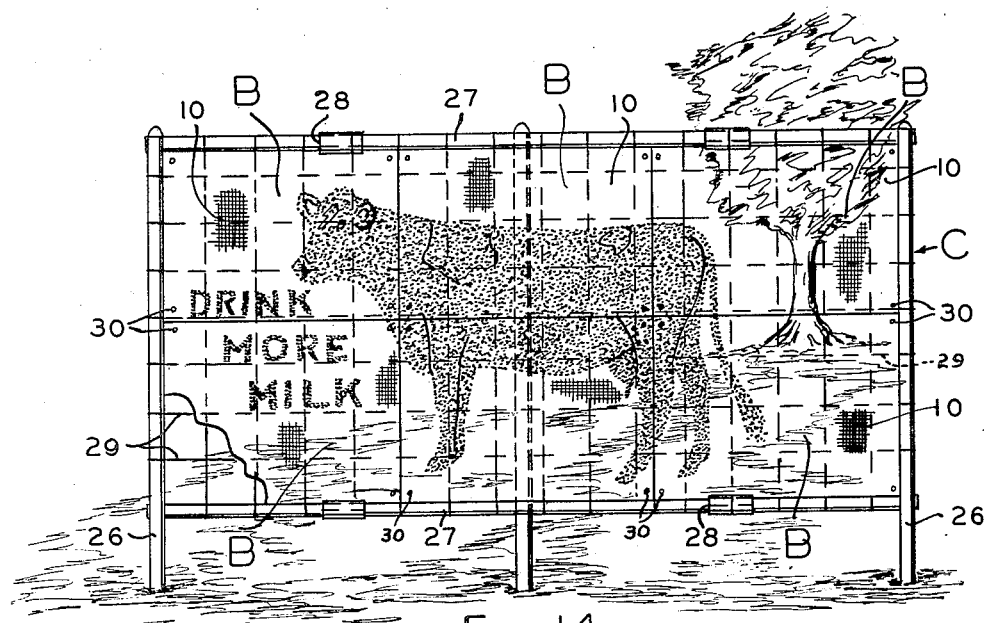

Figure 14 illustrates an outdoor billboard of my sectional display sign which is made up by my method and which is adapted to be set up and displayed out-of-doors where the background scenery can be taken advantage of, owing to the nature of the open wire mesh of my screen sign, and showing the sections attached to a wire fence background which is supported by suitable members anchored and braced in the ground.

Figures 15, 16:
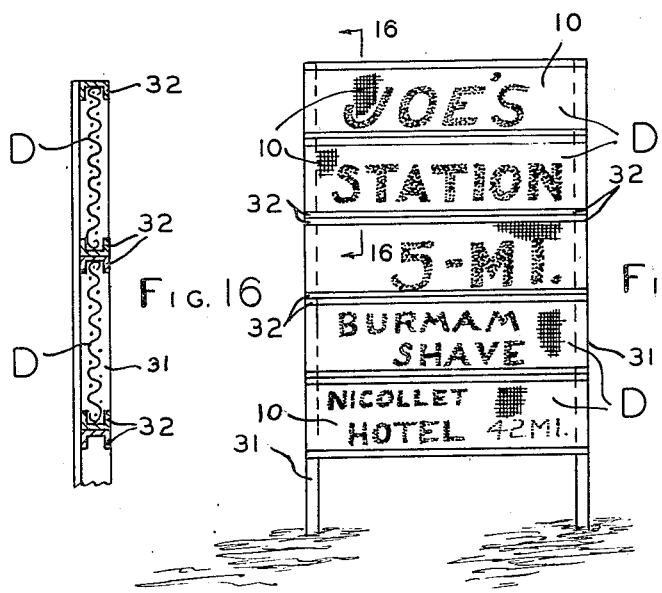

Figure 15 illustrates another outdoor sign wherein the sections of the sign may be supported in channels formed in the frame of the sign so that the individual sections may be slid into or out of the channel supporting frame whenever it is desirable.

Figure 16 is a section on the line 16—16 of Figure 15.

Figure 17:
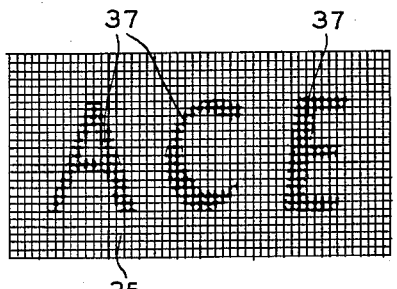

Figure 17 illustrates the top sheet of screen wire on which has been stenciled in paint the word "ACE."

Figure 18:
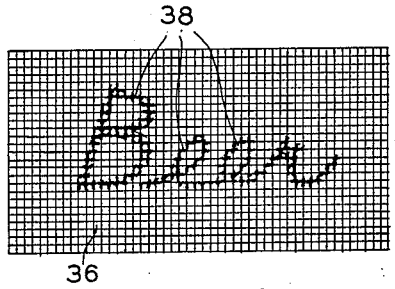

Figure 18 is the wire screen on which the word

"BEER" has been stenciled and wherein small glass beads have been secured in the paint or adhesive before the same is dry.

Figure 19:
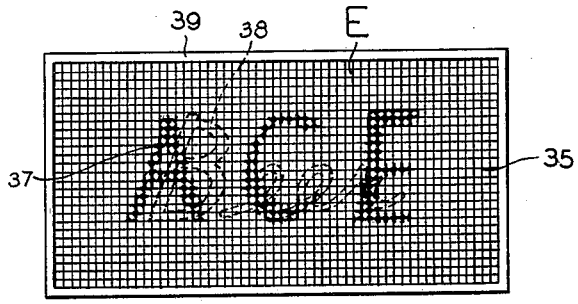

Figure 19 illustrates the completed sign made up of the screen shown in Figures 17 and 18 which are secured together with the screen shown in Figure 17 on top of the screen shown in Figure 18.

Figure 20:
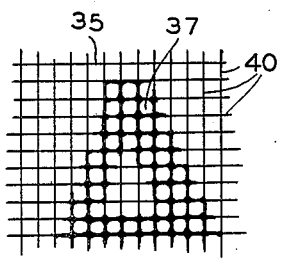

Figure 20 illustrates an enlarged detailed portion of the "A" shown in the screen illustrated in Figure 17.

Figure 21:
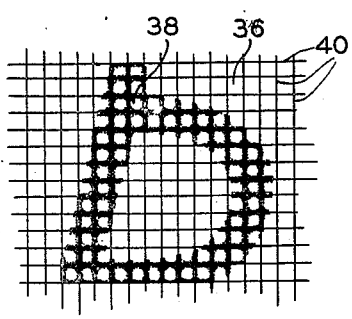

Figure 21 illustrates an enlarged detailed portion of the screen showing part of the letter "B" of the screen shown in Figure 18.

Figure 22:
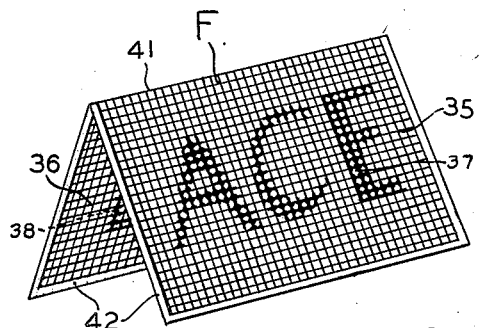

Figure 22 illustrates the sheets shown in Figure 17 and 18 hinged together at the top and with the sheets of the screen showing the words "ACE" on the front screen and "BEER" on the back screen and formed of a single piece of screen which may be folded at the top to form an easel-like display as illustrated.

In making up my display signs I employ a wire screen 10 for a supporting background for the sign or display as illustrated in Figure 1. The wire screen 10 may be of the ordinary type used on screen doors and windows, and in fact my signs may be made up for screen doors, windows or the like where screen is employed. However, I have found that my sign has particular advantages as an outdoor display sign owing to its low wind resistance and the advantages that are obtained by permitting the background scenery to be clearly visible through the wire screen around and between the display formed on the screen 10.

In carrying out my process, the first step of my method is to apply a clear lacquer 11, a colored paint, or any suitable adhesive material which may be stenciled by silk screen process on the wire mesh 10 in the form of a display as partially illustrated in Figure 2 and as shown by the complete sign illustrated in Figure 1.

The second step of my method resides in dusting any suitable color of fibrous flock 12 on to the adhesive or paint 11 before it is dry so as to cause the flock to adhere to the screen where the adhesive or paint has been applied. The first application of the flock to the wires 13 of the screen 10 is rather thin and projects between the wires owing to the fact that the adhesive 11, which may be any suitable color or may be transparent, runs around the wires 13 even though the same is applied to one surface of the screen 10 by silk screen process. This provides an advantage in laying down a base layer of fibrous flock 12 owing to the fact that the flock clings around the wires sufficiently to anchor the display to the individual wires of the screen 10.

In applying the adhesive 11 to the surfaces of the wires 13 of the screen 10, the same may practically extend around the wires 13 where it is stenciled on to the same, and thus the base layer of flock 12 will firmly adhere around the wires 13. In this manner I establish a base covering for my display sign over the wires which are covered by the finished sign, and this base covering of flock acts as an anchoring means to hold the display sign firmly to the wire mesh 10.

In the next step of my method I apply a layer 14 of adhesive, which may be paint or lacquer of any color, over the base layer of flock 12, and over this layer of adhesive 14 I dust another layer of flock 15 which completes the next step of my method which is illustrated diagrammatically in Figure 3. This step of my process, which I have just described in the application of the adhesive layer 14 and the dusting on of the flock 15, is carried out by shifting the silk screen sufficiently to offset the same along the edge which I desire to accentuate by shading. This permits a marginal shading of the letters by the base flock 12 which is preferably of a different color than the second layer of flock 15.

The next step of my process is carried out by applying a coat of paint, lacquer, or adhesive of any suitable color such as 16, which is offset or out of registry with the first and second layers of flock 12 and 15, and while this layer of adhesive 16 is moist or wet, I dust onto the surface of the same light reflecting glass beads 17 which become imbedded into the adhesive 16 sufficiently to thoroughly anchor the reflecting beads 17 to the surface of the letters of the display sign A illustrated in Figure 1.

Therefore, it will be apparent in carrying out the different steps of my process, where I desire to shade one edge of the letters or display of the sign, that each layer is shifted sufficiently to carry the application of the adhesive to one side so that along the shaded edge the colors of the various layers of flock will appear which materially enhances the character of the letters and the display. This will be apparent if we say that the lower layer of flock 12 is red; then the next layer of flock 15 may be blue, and the next layer of paint 16 may be white. Thus, along the shaded edge of the letters the colors red, blue and white will appear. This contrast of colors along the shaded edge of the letters makes the letters of the sign stand out in relief, and as a matter of fact, the letters of the sign are built up to such an extent that the top surface of the letters are elevated in relief above the surface of the wire screen 10 which supports the same.

In this manner I provide a display sign of a very attractive nature when it is viewed in the daytime, and when the sign is viewed at night, the glass light reflecting beads will reflect any light shown against the same so as to provide a brilliant display either by day or night.

The wires of the screen mesh 10 may be completely coated with reflecting beads 17 which are deposited on the wet paint covering the wire strands to make a completely reflective background for the sign. The paint may be of any color. The cross section of the wire having the paint and beads is illustrated in Figure 6 of the drawings.

The method consists in silk screening or applying a color or clear adhesive onto the screen (which forms the background and support) and dusting into the wet colored or clear adhesive rayon, cellulose, nylon, fluorescent or non-fluorescent flock. Wood flour may be used to dust into the wet adhesive, as well as sawdust and clear or transparent light reflecting glass beads, or the beads may be made of another material such as Lucite.

The method further includes building up of layers of adhesive and flock and topping off the last layer of the adhesive with a colored adhesive paint and with or without a surfacing of glass beads depending upon whether the sign or display is for the purpose of reflecting light directed against the same or if a fluorescent flock is desired which also collects and gives off a glowing light.

It is desirable that the flock used be of a low moisture absorbing nature so that my displays or signs will withstand the weather conditions. Thus, my displays will readily shed to a large degree water and rain and moisture in the air. I have found that the rain will ordinarily wash off my displays to keep them brilliant for a long period of time.

In Figure 7, I have illustrated a sign where the letters of the sign are not shaded along one edge as is illustrated in the sign shown in Figure 1. The sign illustrated in Figure 7 is finished with an upstanding flock 18 as illustrated in the enlarged cross section in Figure 8. This gives the surface of the sign a soft velvet-like texture, and when the upstanding flock 18 is of a fluorescent character, it makes a very brilliant display sign.

In Figure 9, I have illustrated an enlarged cross section to show the foundation flock 12 over which a brilliant aluminum paint 19 is covered. While the paint 19 is wet, I dust on a layer of cellophane spangles 20 (small flakes of cellophane) which intensify the brilliance. Then the next step of my process in finishing the sign illustrated in cross sectional detail in Figure 9 is to apply a transparent adhesive 21 over the cellophane spangles 20, and while the adhesive 21 is wet, I imbed a surface of small transparent glass reflecting beads 22.

It will be apparent that in carrying out my process, between each application of adhesive, then flock, then adhesive, and then more flock or other material to build up the different layers, it is necessary that each layer dry sufficiently to receive the next layer so that when the sign is completed, it will have a durable nature.

If it is desired to illustrate a product on the surface of the display or sign, this may be done by imbedding such articles as coffee beans or ground coffee 23. It is also apparent that such articles as wheat 24 may be imbedded into the surface of my display, and also particles of coal 25. These are just a small example of the variations of my display which may be carried out by my method of building up an ultimate display with an attractive nature and having a brilliant finish which is sharply visible during the day and at night when light is reflected against the same.

A further development of my display resides in forming the same in the sections B illustrated in Figure 14, which shows an outdoor billboard C made up of a series of vertical frame members 26 which may be made of pipe, or other suitable frame members. These vertical members 26 may be set in concrete in the ground and may be connected by horiontal members 27. The members 27 are provided with adjustable members 28 which are threaded or otherwise attached so that the frame of the sign may be adjusted. The upright members 26 may also be provided with similar adjusting members 28. These adjusting members are for the purpose of stretching the surface of the display sign taut to give a smooth display surface.

The billboard C illustrated in Figure 14 is preferably made up of the frame members 26 and 27 and such other members as may be necessary to make a strong frame, but which are not illustrated in the drawing. As a support for the sections B which make up the decorative sign or display, I provide a wire fencing 29 which is firmly secured to the frame members 26 and 27 of the sign. The open fence-like mesh wire portion 29 acts as a foundation on which the screen sections B are mounted or anchored in any suitable manner.

Each section B of the billboard C may be formed with corner eyelets 30 to permit the sections to be secured to the wire 29. Further, the sections B may be connected together overlapping the budding edges of the adjacent sections.

Therefore, it will be apparent that my wire screen display sign may be used in making up an outdoor billboard or any other sign which reduces the wind resistance owing to the open wire mesh 10 used for supporting my display and upon which the same is built up. Further, the background scenery may be sufficiently visible through the billboard C so as to add an attractive character to any outdoor display which is made up by my process and method. This is illustrated by the tree shown in Figure 14 which is behind the billboard C.

My sectional signs may be made in units D, which are adapted to be supported by a suitable frame made up of vertical members 31 which may be anchored in the ground and which are connected by the channel-shaped cross members 32. In this manner I provide a sectional sign with the units D slid into place in the channels 32 and anchored in any suitable manner. The units D are removeable for reprocessing or to permit changing the illustration appearing on the units D. Each of the units D of the sectional sign shown in Figure 15 are processed by my method heretofore described, and the illustrations on the same are built up on the screen wire 10.

The signs illustrated in Figures 15 and 16 are adapted for use where it is desired to illustrate a number of different names on the same sign or several messages on the same general sign held by the frame. Signs of this character are used at lake homes and are placed on the highway back from the cottages and are adapted to indicate the names of the different people residing down at the lake in a certain community. Then again a sign of this character may be used for any purpose along the highway. It is a feature to provide a sign of the character shown in Figures 15 and 16 which includes the changeable sign sections D.

The individual signs may be formed with a bound metal edge, like turning the edge of calendars, or the edge of the screen itself may be doubled back in a single or double seam, and while neither of these edgings are shown in the drawings, it is obvious that such binding may be used to finish the edges of the individual sections B or D.

In the billboard sign illustrated in Figure 14, an illustration of a cow is shown, and any advertising wording may be also applied as well as the slogan, "Drink More Milk," or any other indicia or illustrations.

It will be apparent that the outstanding features of my method reside in the manner of building up a sign on a screen wire support with the under-layer of adhesive and flock extending around the wires of the screen so as to firmly anchor the display to the same. After the base layer has been completed by my method, any number of layers may be applied over the base layer and any colors may be employed to give a sign or illustration of an attractive contrasting nature, either for the shading of the letters or illustrations or to accentuate one portion of the sign from another. A further feature resides in a sign made of wire mesh on which the illustrations are formed by painting, stenciling, or in any manner building up the illustrations, pictures, wording or other features desired to be shown on the sign. Illustrations and signs made by this process and method have a very attractive nature owing to the fact that they appear to be in relief and the texture of the illustration is of a pleasing nature. It is important that they are also visible at night by light reflection.

A further feature of importance is that my method may be employed to build up a large sign made up in sections which will fit together on a billboard or support to give a complete large illustration of the desired nature.

A further feature which has also been set forth includes the low wind resistance of a sign of this character owing to the fact that the screen provides an open mesh through which the air may readily pass. The size of the mesh used in carrying out my method is determined when the method is executed and may be of any nature adaptable to the particular sign desired.

Further, small sections may be made which can be used individually as pointed out in Figures 15 and 16, or the signs may be processed and completed on screen doors of merchandising stores.

My method also includes the building up of a sign on either side of the screen. While I have only illustrated the forming of a sign on one side of the screen, it is obvious that the same process may be employed to build up an illustration or sign on the opposite side of the screen so that the sign may have a double function, namely that it may be read from either side or that it may hang transversely of the highway to illustrate a different or the same sign on both sides thereof.

My signs are particularly adaptable to be attached to farm fences along the highway, and when the glass beads are used on the top surface thereof, these signs will appear to be illuminated as automobile lights shine on the same at night. Any movement of the fence on which the signs are attached will add to the attractiveness of the sign which moves with the fence and thus attracts the eye of the observer.

In the drawings, in Figures 17 to 22 inclusive, I have illustrated another form of my display which includes two or more sheets of wire screen, such as 35 and 36. The sheet 35 forms the top surface or portion of the sign E. In this form of my display the front screen 35 is adapted to carry a display of any desired nature such as I have illustrated by the indicia ACE to indicate the word "ACE" formed by the letters 37. On the wire screen 36 I stencil or paint indicia or display formed by the letters 38 which, in this case, spell the word "BEER." In forming the display in sheet 36, it is desirable that minute transparent glass light reflecting beads be dusted on to the wet paint or adhesive which make up the display 38 before the same is dry so that the glass beads will adhere to the painted surface of the screen and thus provide a light reflecting means which enhances the brilliance of my display sign E.

The sign E is made up of the front screen sheet 35 and the rear screen sheet 36 and these sheets are adapted to be bound together by the marginal binding 39 which may be of plastic, metal, or any other suitable binding means adapted to form a finished edge around the sign E.

It will also be apparent that the indicia or display 37 and the display 38 on the respective screens 35 and 36 may be made in any suitable color to provide a contrast in relation to the background or screen mesh of the sheets 35 and 36 and to also make the display more attractive.

Figure 20 illustrates a small enlarged section of the screen 35 showing a portion of the indicia letter "A" which is indicated as the display 37 and showing more clearly the manner in which the display adheres to the wires 40 of the screen.

I have also shown in Figure 21 the wires 40 of the screen sheet 36 in enlarged form and indicating the indicia display 38 adhered to the wires. In each instance where a display of this character is made, it is desirable that an open space remains between the crossing wires 40 of the sheets 35 and 36 where it is desirable to permit the sheets in the rear of the front sheet 35 to be visible; however, the display on the rear sheet 36 may be opaqued over its entire surface if it is desired, which will accentuate the display on the rear sheet 36 under certain light conditions.

A further feature of this form of my display will be apparent in that in the first case the sign E is made up of the two sheets 35 and 36 which are bound together by the marginal finishing edge 39, and the sheets 35 and 36 virtually lie in parallel relation to each other, either close together or spaced apart as may be desired to give the most effective display.

In the display sign F, illustrated in Figure 22, the sheets 35 and 36 are integral but are hinged or joined together along the top edge 41 which permits the lower free edges 42 of the respective sheets to be spaced apart in a manner to form an easel display as illustrated.

A further feature of my display resides in the attractive nature of the same which is apparent when either sign E or F are viewed from different angles under varying light conditions. I have found in my observation of my signs under different positions and under varying reflecting lights, that either the display on the front sheet 35 will be visible without showing the display on the sheet 36, or in other cases both displays will be visible to the eye when viewing the signs E and F from different angles.

Therefore, it will be apparent that a very attractive display sign may be made up by my method and process and the combination of various sheets of screen material.

It is also apparent that the screen material may be made of wire in various colors or screen material made of cloth and such other material as acetate, some of which is known as Nylon and Vinylite, and other similar products known by the various trade names to designate the particular product. In each case, the screen used in making my display sign is visible and is formed with open spaces between the strands, wires, or members forming the screen.

I claim:

1. A sign comprising a wire mesh, a layer of colored flock adhered to said wire mesh to form an anchoring base for the sign, a plurality of layers of decorative material disposed upon said base forming a decorative surface projecting from the surface of said wire mesh base, each decorative layer laid on above said base layer of flock being offset to provide a decorative marginal shading edge, and a top decorative layer of a contrasting color from that of the lower layers and having a series of light reflecting glass beads imbedded therein to cause the sign to be visible at night when light is reflected on the same.

2. A sign including a stiff mesh base, a coating of adhesive material applied to said mesh, a coating of flock applied to said adhesive in the decorative design desired, a second coating of adhesive applied over said flock, a second coating of flock applied to said second coat of adhesive in offset relation to the desired edge of said first coat of flock to produce a shading effect, a final coat of adhesive applied over said second coat of flock, and a coating of small glass light reflecting beads applied to said last coat of adhesive to provide an irregular surfaced reflective shaded sign in relief having a wide angularity of light entrance and reflection to and from said beads.

MATTHEW H. PHILLIPPI.

REFERENCES CITED

The following references are of record in the file of this patent:

UNITED STATES PATENTS

| Number | Name | Date |
|---|---|---|
| 998,952 | Boone | July 25, 1911 |
| 2,354,018 | Heltzer | July 18, 1944 |
| 2,384,951 | Millar | Sept. 18, 1945 |

FOREIGN PATENTS

| Number | Country | Date |
|---|---|---|
| 306,249 | Italy | Mar. 2, 1933 |